United States Patent
Hino

(10) Patent No.: US 12,392,972 B2
(45) Date of Patent: Aug. 19, 2025

(54) OPTICAL TRANSCEIVER

(71) Applicant: Sumitomo Electric Device Innovations, Inc., Yokohama (JP)

(72) Inventor: Masato Hino, Yokohama (JP)

(73) Assignee: Sumitomo Electric Device Innovations, Inc., Yokohama (JP)

( * ) Notice: Subject to any disclaimer, the term of this patent is extended or adjusted under 35 U.S.C. 154(b) by 483 days.

(21) Appl. No.: 18/089,662

(22) Filed: Dec. 28, 2022

(65) Prior Publication Data

US 2023/0213047 A1 Jul. 6, 2023

(30) Foreign Application Priority Data

Jan. 6, 2022 (JP) ................................. 2022-001102

(51) Int. Cl.
*G02B 6/42* (2006.01)
(52) U.S. Cl.
CPC .................................. *G02B 6/4278* (2013.01)
(58) Field of Classification Search
CPC .................................................... G02B 6/4278
See application file for complete search history.

(56) References Cited

U.S. PATENT DOCUMENTS

| 6,929,403 B1 | 8/2005 | Arciniegas et al. |
| 2008/0232758 A1* | 9/2008 | Miyoshi ............... G02B 6/4201 385/136 |
| 2010/0091467 A1* | 4/2010 | Wu ....................... G02B 6/4284 361/728 |

FOREIGN PATENT DOCUMENTS

JP 2016-186542 A 10/2016

* cited by examiner

*Primary Examiner* — Uyen Chau N Le
*Assistant Examiner* — Hoang Q Tran
(74) *Attorney, Agent, or Firm* — McCarter & English, LLP; Michael A. Sartori

(57) ABSTRACT

An optical transceiver includes an outer part provided outside the apparatus upon an engagement of the optical transceiver with the apparatus. The outer part includes a first spindle, a rotational member, a sliding member. The rotational member is configured to rotate on the first spindle. The sliding member is configured to move along the first direction. The rotational member has a hole. The sliding member has a second spindle. The first spindle and the second spindle are fit with the hole. The optical transceiver includes an inner part provided inside the apparatus upon the engagement with the apparatus. The hole has a first circular area, a second circular area, and a straight area. The first spindle is fit with the first circular area. The second spindle is fit with the second circular area. The straight area is connected between the first circular area and the second circular area.

7 Claims, 12 Drawing Sheets

OPTICAL TRANSCEIVER

CROSS-REFERENCE TO RELATED APPLICATION

This application claims priority from Japanese Patent Application No. 2022-001102, filed on Jan. 6, 2022, the entire subject matter of which is incorporated herein by reference.

TECHNICAL FIELD

The present disclosure relates to optical transceivers.

BACKGROUND

U.S. Unexamined Patent Publication No. 2010/0091467 describes an electronic module including a base portion, a conduction panel portion, a circuit board, a cable, a gasket, and an extraction mechanism for an apparatus. A circuit board is accommodated between the base portion and the conduction panel portion. The extraction mechanism has a slide member, an actuator member, a fastening member, and a withdrawal member. When the withdrawal member is pulled, the actuator member rotates, and the slide member moves. The electronic module is extracted from the apparatus in association with the movement of the slide member.

Japanese Unexamined Patent Publication No. 2016-186542 discloses a pluggable optical transceiver module that can be inserted into and extracted from a cage of a host apparatus. The pluggable optical transceiver module includes a main body part, a front base, an extraction bar, and a slider. The extraction bar has a grip portion located at an end of the extraction bar and a cam plate located at an end of the extraction bar opposite to the grip portion. The slider has a release protrusion located at an end of the slider and a cam protrusion located at an end of the slider opposite to the release protrusion. When the extraction bar rotates, the cam plate pushes the cam protrusion to move the slider, and the pluggable optical transceiver module is disengaged from the cage by the movement of the slider.

U.S. Pat. No. 6,929,403 describes an optical module with a latch mechanism that engages a latch in a host cage. The latch mechanism has a bail that can be rotatably operated and a latch key that moves in association with the rotating operation of the bail. A spindle having a cam surface that is in contact with the latch key is formed on the end of the bail. When the bail is rotated, the cam surface presses the latch key. As the latch key is allowed to slide in association with the pressing of the latch key, and by allowing the latch key to push the latch down, the optical module is disengaged from the latch.

SUMMARY

An optical transceiver according to the present disclosure is an optical transceiver to be inserted into an apparatus along a first direction and be engaged with the apparatus. The optical transceiver includes an outer part provided outside the apparatus upon an engagement of the optical transceiver with the apparatus. The outer part includes a first spindle, a rotational member, a sliding member. The rotational member is configured to rotate on the first spindle. The sliding member is configured to move along the first direction. The rotational member has a hole. The sliding member has a second spindle. The first spindle and the second spindle are fit with the hole. The optical transceiver includes an inner part provided inside the apparatus upon the engagement with the apparatus. The hole has a first circular area, a second circular area, and a straight area. The first spindle is fit with the first circular area. The second spindle is fit with the second circular area. The straight area is connected between the first circular area and the second circular area.

DETAILED DESCRIPTION

Figure 1:
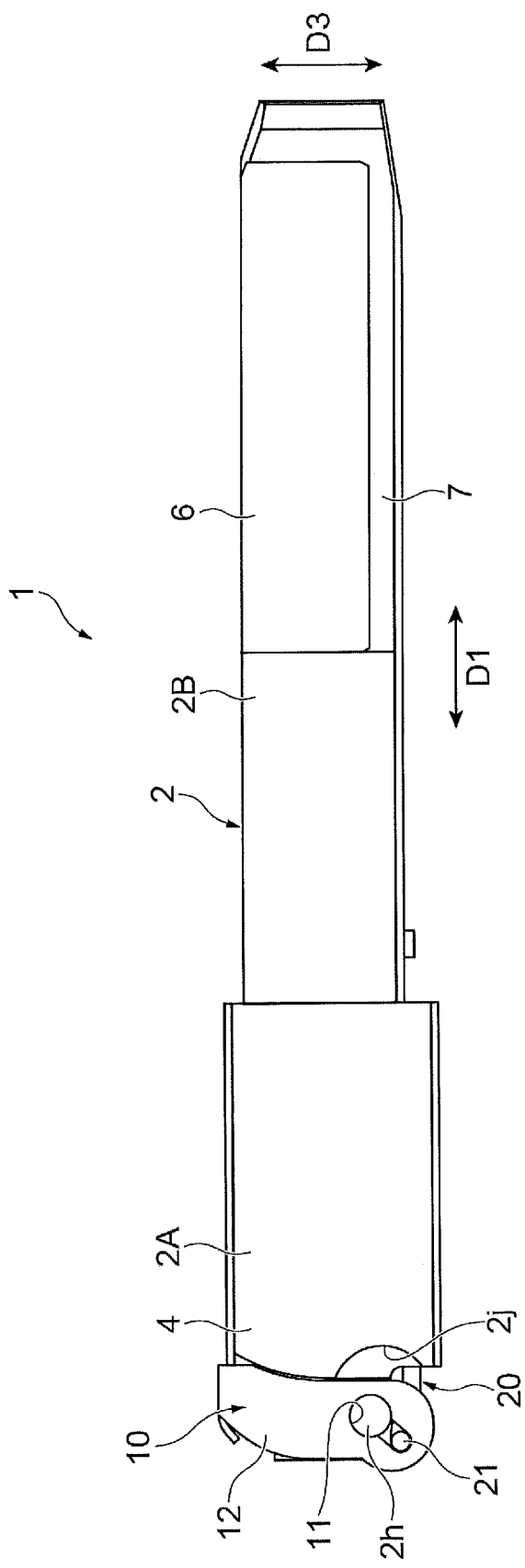
FIG. 1 is a side view illustrating an optical transceiver according to an embodiment.

Specific examples of an optical transceiver according to an embodiment of the present disclosure will be described below with reference to the drawings. It is noted that the present invention is not limited to the following examples, but is intended to include all modifications indicated in the scope of the claims and within the scope equivalent to the scope of the claims. In the description of the drawings, the same or corresponding elements are denoted by the same reference numerals, and redundant descriptions are omitted as appropriate. In addition, the drawings may be partially simplified or exaggerated for the better understanding, and the dimensional ratios and the like are not limited to those described in the drawings.

FIG. 1 is a side view illustrating an optical transceiver 1 according to an embodiment. The optical transceiver 1 conforms to, for example, an SFP-DD (Small Factor Pluggable Double Density) standard. The standard stated herein is, for example, MSA (Multi Source Agreement), which is one of industry standards. The SFP-DD standard optical transceiver 1 has a long-plate outer shape. The optical transceiver 1 is, as an example, an SFP-DD standard Type 2 module. That is, a length in a first direction D1, which is the longitudinal direction of the optical transceiver 1, is longer than a length in the longitudinal direction of the SFP standard optical transceiver. As described below, a long-plate outer shape denotes an outer shape that is longer in the longitudinal direction than the outer shape of the SFP standard.

The optical transceiver 1 includes a metal housing 2, a receptacle 4 located at one longitudinal end of the housing 2, a bail 10 (rotational member) rotatably attached to the housing 2, and a slider 20 (sliding member) movably attached to the housing 2. The housing 2 includes, for example, an upper housing 6 and a lower housing 7. It is noted that, in the following description, along the longitudinal direction, the side of the optical transceiver 1 having the receptacle 4 may be referred to as front, a front side, or forward, and the side opposite to the side having the receptacle 4 may be referred to as rear, a rear side, or rearward. The direction of viewing the upper housing 6 from the lower housing 7 may be referred to as up, an upper side, or upward, and the direction of viewing the lower housing 7 from the upper housing 6 may be referred to as down, a lower side, or downward. However, these directions are for the convenience of description and do not limit arrangement positions of objects.

Figure 2:
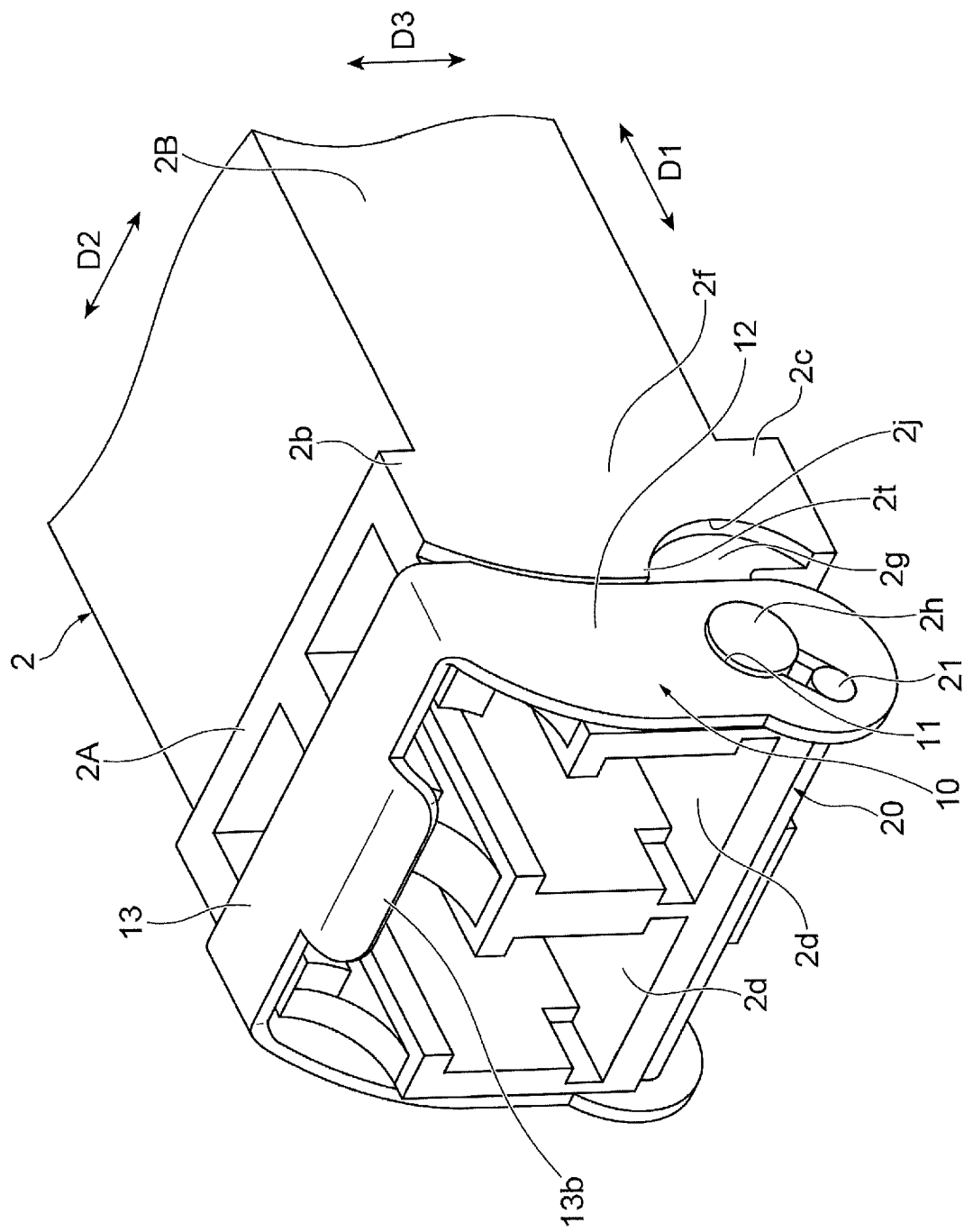
FIG. 2 is a perspective view illustrating a rotational member of the optical transceiver according to the embodiment.

FIG. 2 is an enlarged perspective view of the front portion of the optical transceiver 1. As illustrated in FIGS. 1 and 2, the housing 2 extends in a first direction D1, a second direction D2 that is a width direction of the optical transceiver 1, and a third direction D3 that is a height direction of the optical transceiver 1. The first direction D1, the second direction D2, and the third direction D3 are perpendicular to each other. The length of the optical transceiver 1 in the first direction D1 is longer than the length of the optical transceiver 1 in the second direction D2 and the length of the optical transceiver 1 in the third direction D3. The housing 2 has a rectangular parallelepiped shape, for example, when the housing 2 is cut along a plane perpendicular to the first direction D1, an outer shape of a cross section of the housing 2 is an rectangular shape. The optical transceiver 1 is inserted into and extracted from a cage provided in a host system (apparatus) along the first direction D1.

The housing 2 has an outer part 2A exposed to an outside the host system in a state where a rear side of the optical transceiver 1 is inserted into the cage and is engaged with the host system and an inner part 2B accommodated inside the host system. For example, in the first direction D1, the outer part 2A is located at one end on the front side of the optical transceiver 1, and the inner part 2B is located rearward from the outer part 2A. The outer part 2A and the inner part 2B have a rectangular parallelepiped shape. The length of the outer part 2A in the first direction D1 is smaller than the length of the inner part 2B in the first direction D1, and the length of the outer part 2A in the third direction D3 is larger than the length of the inner part 2B in the third direction D3. For example, the length of the inner part 2B in the third direction D3 is smaller than the length of the cage in the third direction D3, and the length of the outer part 2A in the third direction D3 is larger than the length of the cage in the third direction D3. By the way, the lengthening described above denotes that the length of the outer part 2A in the first direction D1 is lengthened. For example, in the SFP standard, the length of the outer part 2A in the first direction D1 is defined to be 10 mm at maximum. In addition, in the SFP-DD standard, the length of the outer part 2A in the first direction D1 is defined to be 25 mm at maximum. Accordingly, in some cases, an outer shape in which the length of the outer part 2A in the first direction D1 is larger than 10 mm may be referred to as a long-plate outer shape. In addition, an outer shape in which the length of the outer part 2A in the first direction D1 is 10 mm or less may be referred to as a short-plate outer shape or a normal-plate outer shape. FIG. 1 illustrates an example of the long-plate outer shape.

FIG. 2 illustrates an example of the normal-plate outer shape. For the convenience of description, FIGS. 3 to 12 to be described below all illustrate examples of the normal-plate outer shape. Due to the lengthening, the bail 10 is arranged at a position farther from the inner part 2B than the normal-plate outer shape in the first direction D1. Therefore, the lengthening increases a distance between the bail 10 and the inner part 2B.

Figure 3:
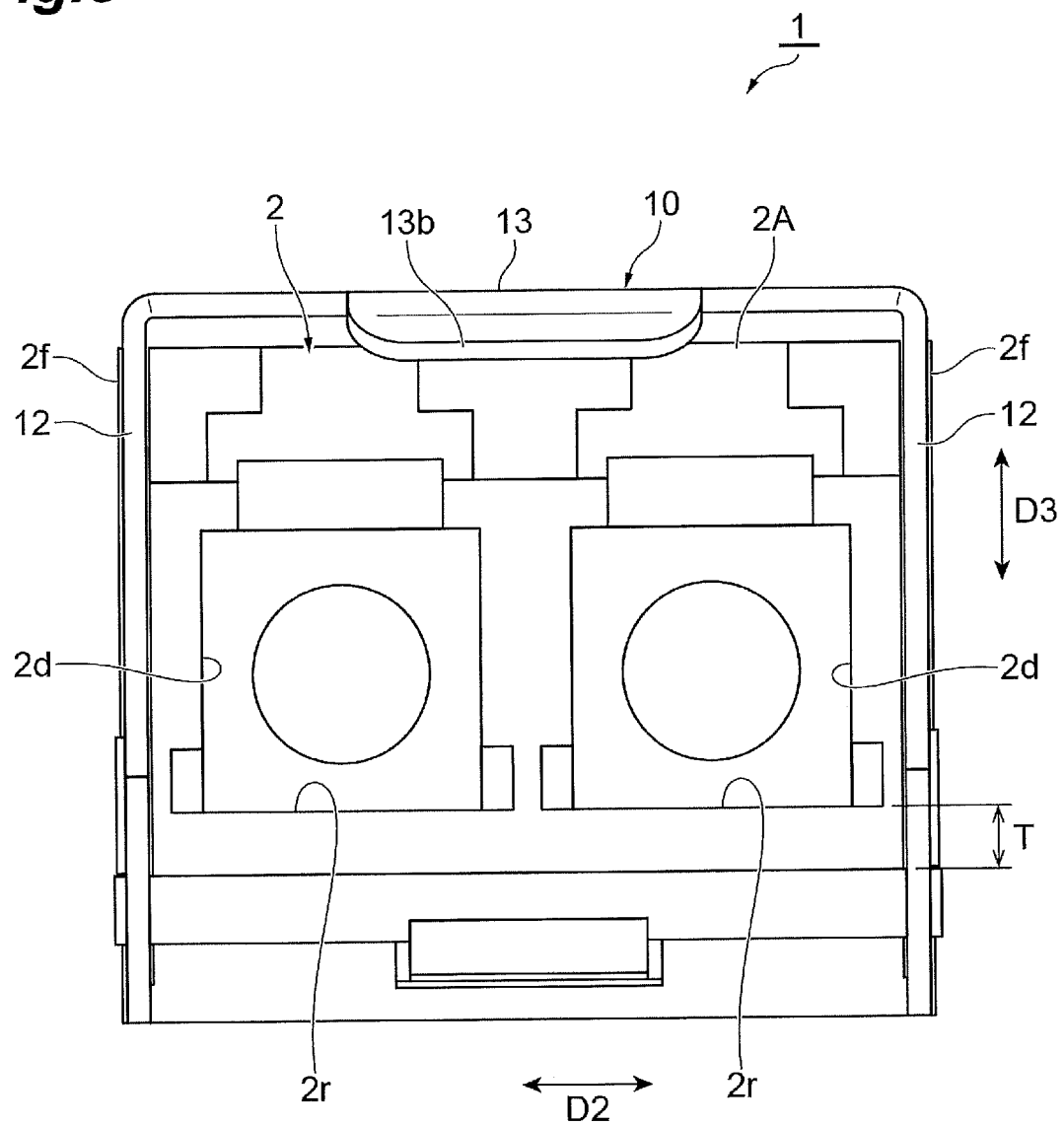
FIG. 3 is a front view illustrating the optical transceiver of FIG. 1.

FIG. 3 is a front view of the optical transceiver 1 viewed from the front along the first direction D1. As illustrated in FIGS. 2 and 3, the outer part 2A of the housing 2 includes a first step portion 2b that protrudes upward from the inner part 2B, a second step portion 2c that protrudes downward from the inner part 2B, a pair of holes 2d that define a recessed portion downward at the first step portion 2b and an inside of the receptacle 4. The pair of holes 2d are aligned along the second direction D2. A thickness T of the housing 2 at a bottom 2r of the hole 2d is determined in consideration of rigidity and manufacturability of the housing 2 and is, for example, about 1 mm. When the thickness T is large, the rigidity of the housing 2 is increased, but a volume of an internal space of the housing 2 is reduced, and thus, there is a concern that parts that can be accommodated inside the housing 2 are limited. On the other hand, when the thickness T is small, the restrictions on the parts that can be accommodated inside the housing 2 are relaxed, but the housing 2 may be deformed by an external force.

The outer part 2A has a pair of side surfaces 2f respectively facing outward along the second direction D2 and aligned along the second direction D2. The direction in which one of the side surfaces 2f faces is opposite to the direction in which the other of the side surfaces 2f faces. Recesses 2g recessed inward along the second direction D2 are formed on the front side of each side surface 2f. The outer part 2A has a pair of recesses 2g aligned along the second direction D2, and the bail 10 enters the pair of recesses 2g. The outer part 2A has a first spindle 2h protruding outward along the second direction D2 in each of the recesses 2g. The bail 10 is engaged with the first spindle 2h.

The bail 10 is configured to be engaged with the first spindle 2h and rotate forward about the first spindle 2h. The outer part 2A has a concave portion 2j recessed rearward at a step difference 2t defining the recesses 2g. The concave portion 2j is a portion into which a portion of the bail 10 enters by the rotating operation of the bail 10. The bail 10 has a through-hole 11 into which the first spindle 2h is fitted. The through-hole 11 penetrates through the bail 10 along the second direction D2. A configuration of the through-hole 11 will be described in detail later. The bail 10 has a pair of first extension portions 12 and a second extension portions 13. The pair of first extension portions 12 have respective through-hole 11 and are aligned along the second direction D2. The pair of first extension portions 12 extend along the direction D3 in a state where the bail 10 is not rotating. The second extension portion 13 connects the pair of first extension portions 12 to each other. The second extension portion 13 extends in a direction intersecting with the direction in which the first extension portion 12 extends. For example, when the first extension portion 12 extends along the third direction D3, the second extension portion 13 extends along the second direction D2. The second extension portion 13 has, for example, a protrusion portion 13b protruding in a direction intersecting the second direction D2 at a portion including the center in the second direction D2.

Figure 4:
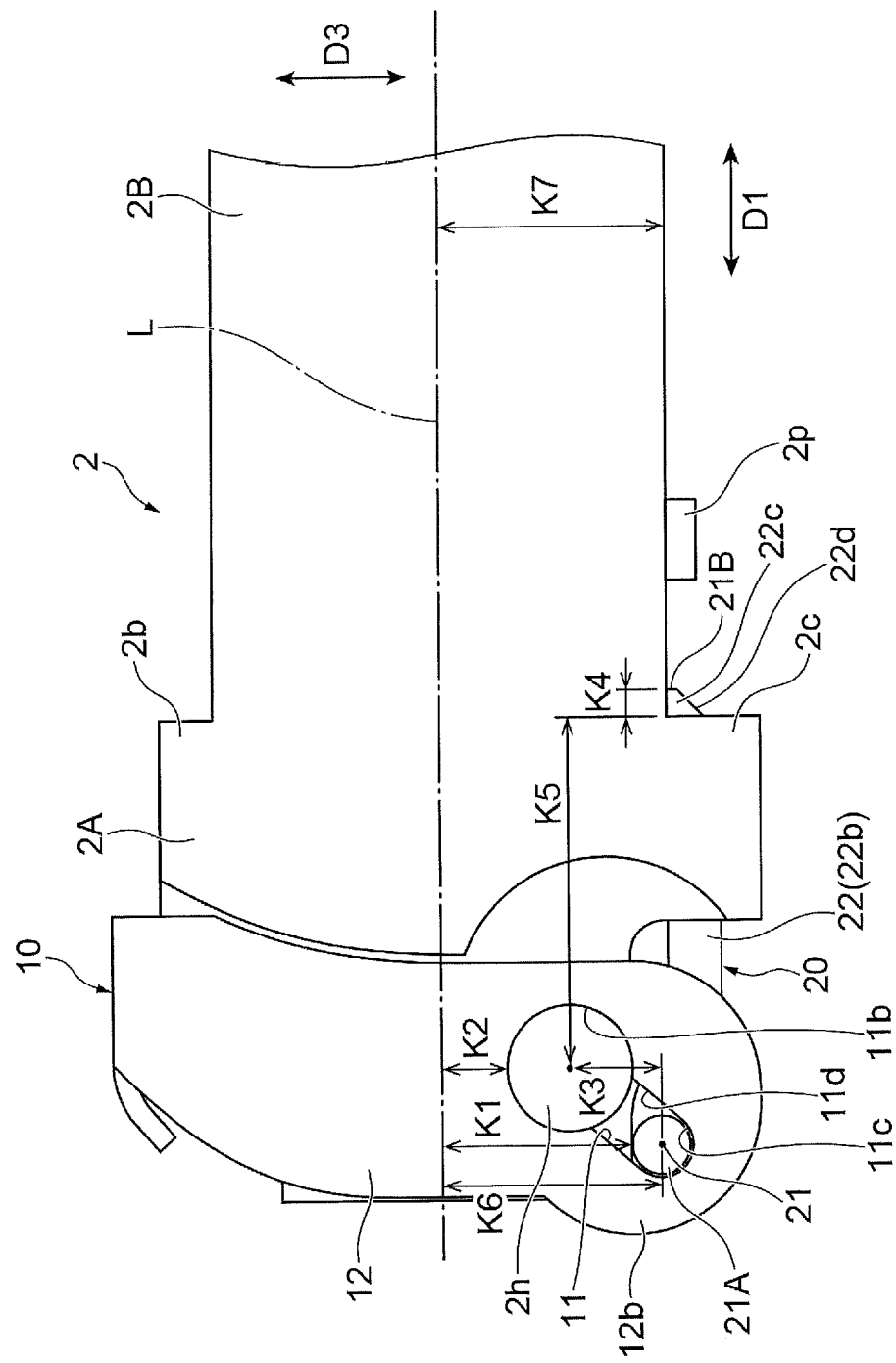
FIG. 4 is a side view illustrating the rotational member of FIG. 2.
Figure 5:
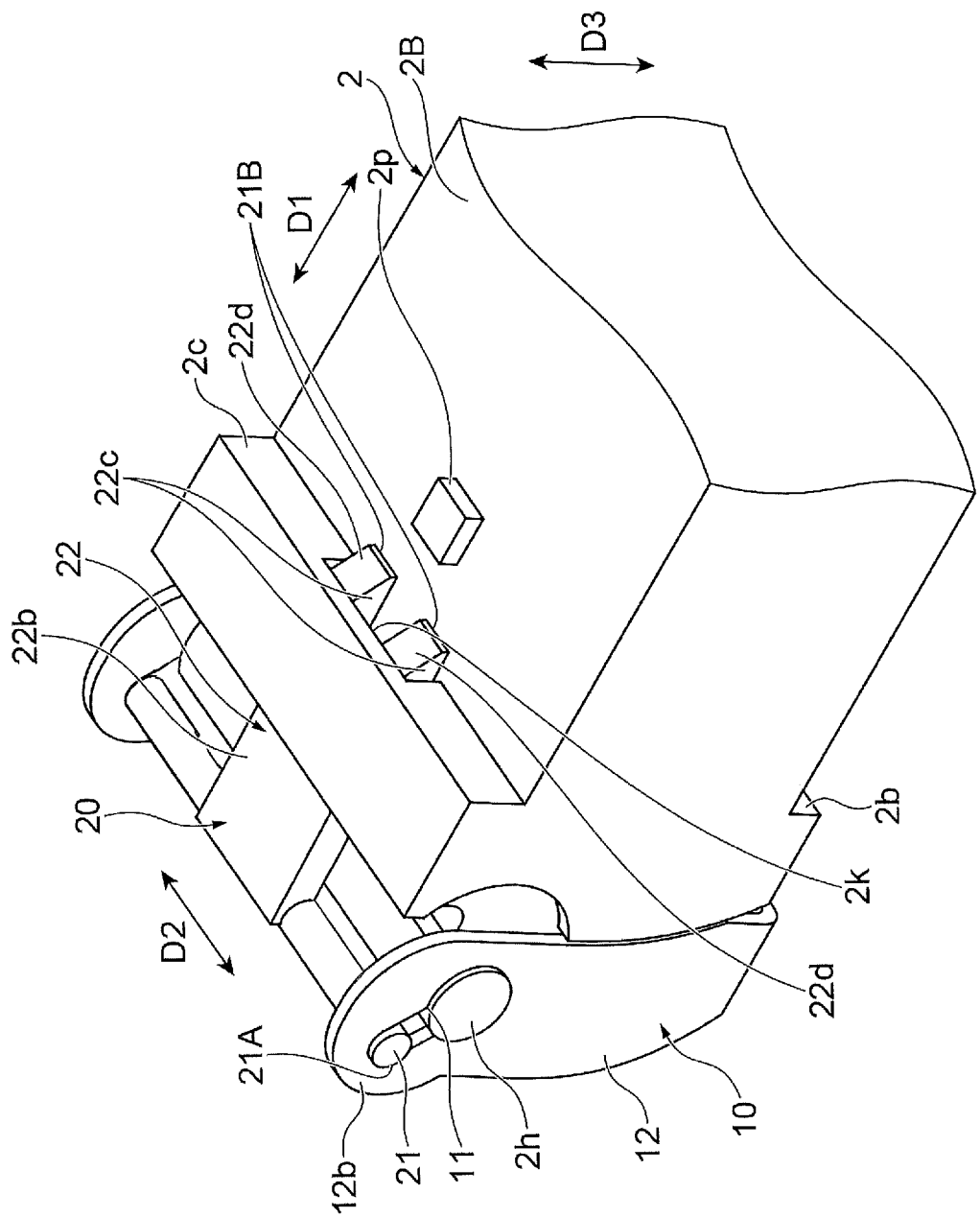
FIG. 5 is a perspective view illustrating a sliding member and a rotational member of the optical transceiver according to the embodiment.

FIG. 4 is a side view of the housing 2 and the bail 10 viewed along the second direction D2. FIG. 5 is a perspective view illustrating the housing 2, the bail 10, and the slider 20. The bail 10 rotates forward and downward around the first spindle 2h as a center line. FIGS. 4 and 5 illustrate a state where the bail 10 is not rotating. The rotating operation is performed when the optical transceiver 1 is disengaged from the cage and the optical transceiver 1 is extracted from the cage. FIGS. 4 and 5 illustrate the state where the optical transceiver 1 is engaged with the cage or the state where the optical transceiver 1 is not inserted into the cage. The first extension portion 12 extends from each of both ends of the second extension portion 13 in the direction D2 toward the first spindle 2h. The first extension portion 12 has a protrusion portion 12b extending at the end opposite to the second extension portion 13 so as to increase the width of the first extension portion 12. For example, the protrusion portion 12b has a circular arc shape at the end of the first extension portion 12, and a portion of the through-hole 11 is formed in the protrusion portion 12b. That is, the protrusion portion 12b protruding forward so as to form the through-hole 11 as described later is provided to the first extension portion 12.

The slider 20 moves rearward along the first direction D1 in association with the rotating operation of the bail 10 and disengages the optical transceiver 1 from the cage of the host system in association with the rearward movement of the slider 20. The slider 20 includes a second spindle 21 that extends along the second direction D2 and enters the through-hole 11 of each of the pair of first extension portions 12 and a release portion 22 that extends rearward from the second spindle 21 and moves rearward in association with the rotating operation to disengage the optical transceiver 1 from the cage. The through-hole 11 of each of the pair of first extension portions 12 is configured as a pair of through-holes 11. For example, one of the through-holes 11 has the same shape as the other of the through-holes 11. The pair of through-holes 11 are formed so that one end of the first spindle 2h enters one of the through-holes 11 and the other end of the first spindle 2h enters the other of the through-holes 11.

The second spindle 21 has an outer end 21A that is engaged with the bail 10, and for example, the second spindle 21 constitutes the outer end 21A. The second spindle 21 has, for example, a cylindrical shape. One end of the second spindle 21 in the second direction D2 is inserted into one of the through-holes 11, and the other end of the second spindle 21 in the second direction D2 is inserted into the other of the through-holes 11. The release portion 22 has a plate shape in a region including the center of the second spindle 21 in the second direction D2. The release portion 22 has, for example, a plate-shaped portion 22b to which the second spindle 21 is connected and a tapered portion 22c located at the end of the plate-shaped portion 22b opposite to the second spindle 21. That is, the second spindle 21 is connected to the front end of the plate-shaped portion 22b, and the tapered portion 22c is provided to the rear end of the plate-shaped portion 22b. The slider 20 has an inner end 21B rearward from the outer end 21A along the first direction D1, and for example, the tapered portion 22c constitutes the inner end 21B. The slider 20 has the inner end 21B at a position extending to the inner part 2B.

For example, the second step portion 2c has a hole portion 2k penetrating in the first direction D1, and the plate-shaped portion 22b of the slider 20 is passed through the hole portion 2k. The plate-shaped portion 22b is movable along the first direction D1 in the hole portion 2k. As an example, the hole portion 2k has a rectangular shape. The release portion 22 has a pair of tapered portions 22c aligned along the second direction D2, and each tapered portion 22c is formed at the rear end of the plate-shaped portion 22b. Each of the tapered portions 22c has an inclined surface 22d that is inclined with respect to both the first direction D1 and the third direction D3.

Figure 6:
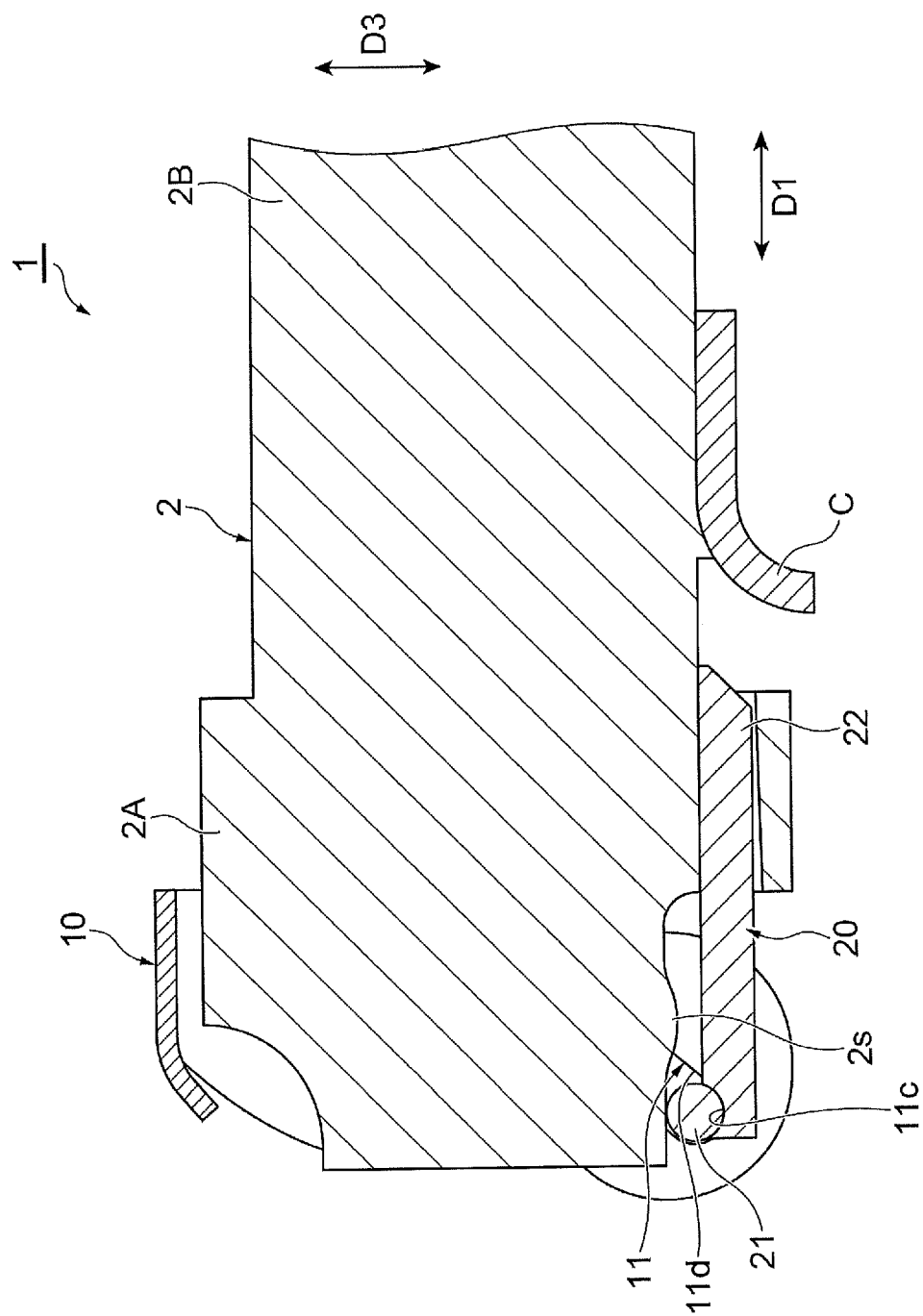
FIG. 6 is a longitudinal sectional view illustrating a housing of the optical transceiver of FIG. 1.

Rearward from the second step portion 2c, a convex portion 2p protruding downward along the third direction D3 is formed on the inner part 2B, and the pair of tapered portions 22c at the two outer sides of the convex portion 2p in the second direction D2 move along the first direction D1 in association with the rotating operation. When the optical transceiver 1 is engaged with the cage, as illustrated in FIG. 6, a cage tab C (refer to FIG. 6 and the like) of the cage is located so as to overlap the position of the convex portion 2p. At this time, the convex portion 2p is fitted into a hole provided in the cage tab C. Accordingly, the optical transceiver 1 is prevented from coming out of the cage along the direction D1 (this state is referred to as engagement). When the tapered portion 22c moves rearward, the inclined surface 22d abuts against the cage tab C. This abutment allows the cage tab C to be pushed downward (pulled up in FIG. 5) along the third direction D3, so that the optical transceiver 1 is disengaged from the cage. More specifically, when the cage tab C is pushed downward, the convex portion 2p is removed from the hole provided in the cage tab C, so that the optical transceiver 1 can move along the direction D1.

An example of designing the dimensions of each component of the bail 10, the slider 20, and the housing 2 will be described below. A distance K1 from the reference line L extending along the first direction D1 through the center of the outer part 2A in the third direction D3 to the second spindle 21 is longer than a distance K2 from the reference line L to the first spindle 2h. When the bail 10 is not rotating forward and downward (the state in FIG. 4, hereinafter sometimes simply referred to as "at the time of not rotating") and when the bail 10 is most rotating forward and downward (the state of FIG. 10, hereinafter sometimes simply referred to as "at the time of most rotating operation"), a distance K3 in the third direction D3 from the center of the first spindle 2h to the center of the second spindle 21 is, for example, 1.70 mm.

A distance K4 in the first direction D1 from the rear end of the second step portion 2c of the housing 2 to the rear end of the slider 20 (the tapered portion 22c of the release portion 22) when the bail 10 is not rotating is, for example, 0.85 mm at maximum. A distance K5 in the first direction D1 from the center of the first spindle 2h to the rear end of the second step portion 2c is arbitrarily set according to the total length of the slider 20 in the first direction D1. For example, the distance K5 of the long-plate outer shape is larger than the distance K5 of the normal-plate outer shape. A distance K6 from the reference line L to the center of the second spindle 21 when the bail 10 is not rotating and when the bail 10 is most rotating is smaller than a distance K7 from the reference line L to an end (lower end) of the inner part 2B in the third direction D3. Herein, a distance (a difference between the distance K7 and the distance K6) between the center of the second spindle 21 and the end (lower end) of the inner part 2B in the third direction D3 is determined in consideration of the rigidity and the manufacturability of the housing 2 and is, for example, about 1 mm. In addition, the upper limit of the length in the third direction D3 of portions from the front side of the first step portion 2b and the second step portion 2c of the housing 2 and a trajectory of the rotating operation of the bail 10 is defined by the MSA.

The first spindle 2h of the housing 2 and the second spindle 21 are engaged with the through-hole 11 of the bail 10. The through-hole 11 includes a first circular area 11b engaged with the first spindle 2*h*, a second circular area 11*c* engaged with the second spindle 21, and a straight area 11*d* connecting the first circular area 11*b* and the second circular area 11*c* to each other. The first circular area 11*b* is formed at one end of the straight area 11*d*, and the second circular area 11*c* is formed at the other end of the straight area 11*d*. That is, the straight area 11*d* is located between the first circular area 11*b* and the second circular area 11*c*. The first circular area 11*b* is expanded into a circular shape at one end of the straight area 11*d*. For example, when the through-hole 11 is viewed along the direction D2, a diameter of the second circular area 11*c* is the same as a width of the straight area 11*d*. In this case, the second circular area 11*c* is not expanded at the other end of the straight area 11*d*. Therefore, the second spindle 21 is movable between the second circular area 11*c* and the straight area 11*d* in the state of being engaged with the through-hole 11. During the rotating operation, the second circular area 11*c* moves toward the first spindle 2*h*, so that the rotating operation is smoothly performed.

For example, the diameter of the circular area of the first circular area 11*b* is larger than the diameter of the semi-circular area of the second circular area 11*c*. The outer shape of the first circular area 11*b* viewed along the second direction D2 is substantially the same as the outer shape of the first spindle 2*h* viewed along the second direction D2. It is noted that the first circular area 11*b* and the first spindle 2*h* are configured so that the first spindle 2*h* can be fitted into the first circular area 11*b*. Therefore, the diameter of the first circular area 11*b* is larger than the diameter of the first spindle 2*h* to the extent that the first spindle 2*h* can fit. The outer shape of the second circular area 11*c* viewed along the second direction D2 is substantially the same as the outer shape of the second spindle 21 viewed along the second direction D2. It is noted that the second circular area 11*c* and the second spindle 21 are configured so that the second spindle 21 can be fitted into the second circular area 11*c*. Therefore, the diameter of the second circular area 11*c* is larger than the diameter of the second spindle 21 to the extent that the second spindle 21 can fit.

FIG. 6 is a cross-sectional view of the optical transceiver 1 cut along a plane extending in both the first direction D1 and the third direction D3. As described above, the forward and downward rotating operation of the bail 10 allows the slider 20 to move rearward, so that the release portion 22 abuts against the cage tab C. The outer part 2A has a convex-shaped stopper 2*s* against which the second spindle 21 moved rearward by the rotating operation of the bail 10 abuts.

As illustrated in FIG. 6, the stopper 2*s* has a curved surface protruding downward. When the rotating operation approaches the most rotating state, a resistive force is exerted to stop the second spindle 21 from moving rearward along the first direction D1 due to the curved surface. In association with the rotating operation of the bail 10, the second spindle 21 moves further rearward over the curved surface downward by being pushed by a force larger than the resistive force. The second spindle 21 moves rearward from the stopper 2*s*, and the bail 10 is in the most rotating state. Even when the bail 10 returns from the most rotating state to the non-rotating state, the resistive force is exerted to stop the second spindle 21 from moving forward. Thus, the stopper 2*s* is provided to prevent the second spindle 21 from returning forward from the state where the bail 10 is most rotating. When the slider 20 moves rearward, the release portion 22 abuts against the cage tab C, and a spring force of the cage tab C can generate a push-back force of pushing the slider 20 forward. The stopper 2*s* stop the second spindle 21 from moving forward by exerting the resistive force so that the slider 20 does not move forward by this push-back force. Accordingly, the optical transceiver 1 can stably maintain the state where the bail 10 is most rotating.

Figure 7:
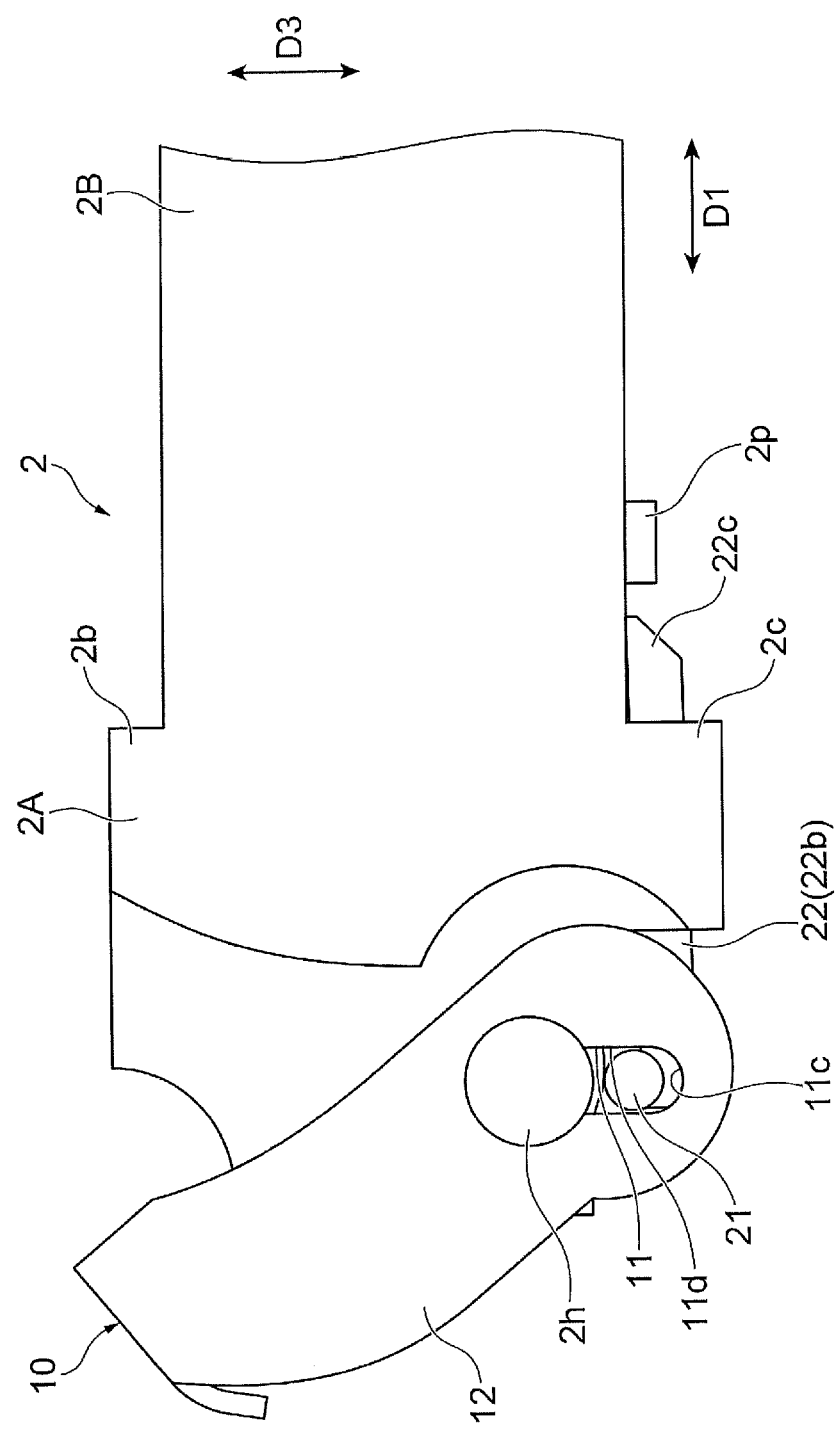
FIG. 7 is a side view illustrating a state where the rotational member of FIG. 4 is rotated.
Figure 8:
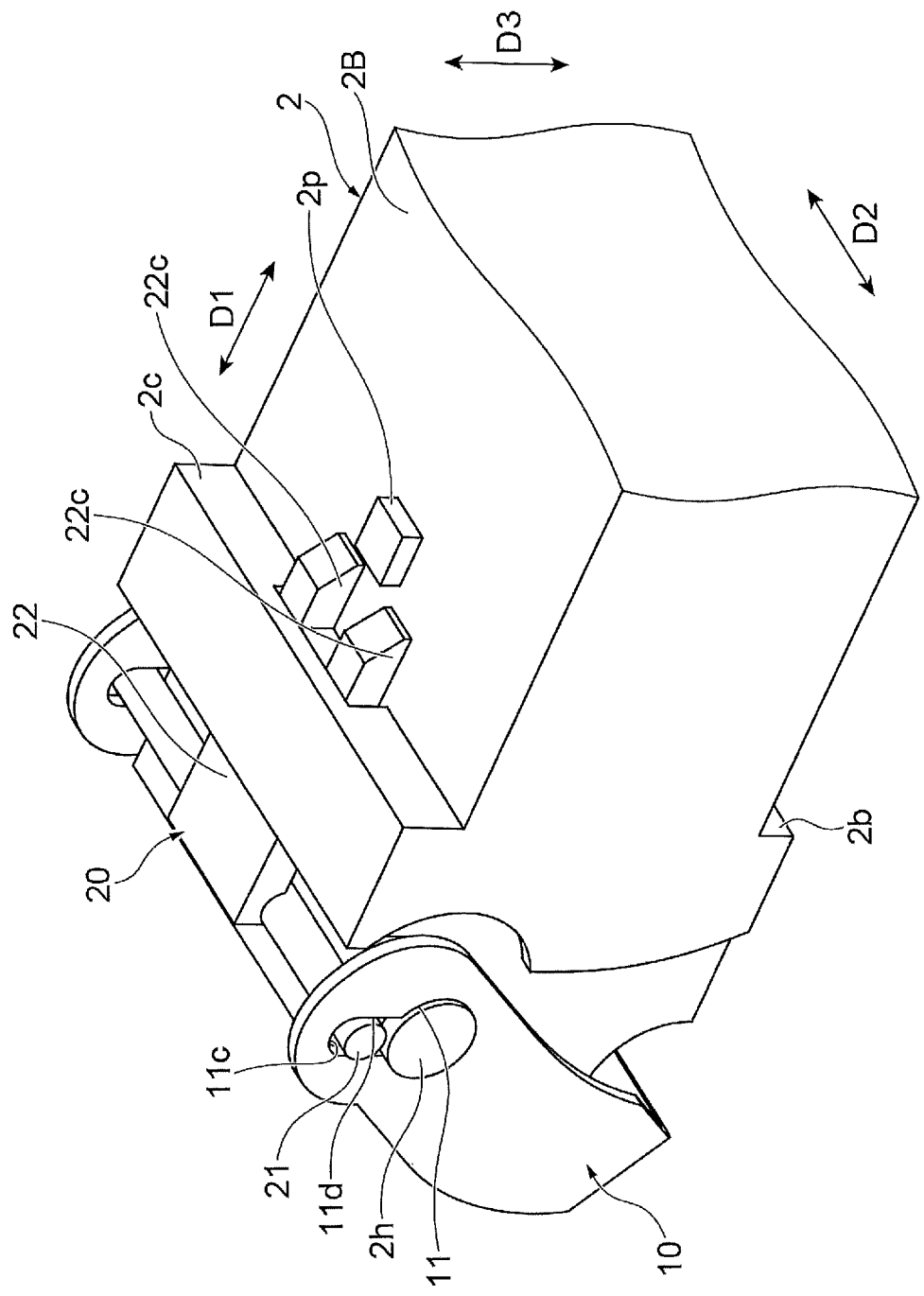
FIG. 8 is a perspective view illustrating the sliding member in the state of FIG. 7.
Figure 9:
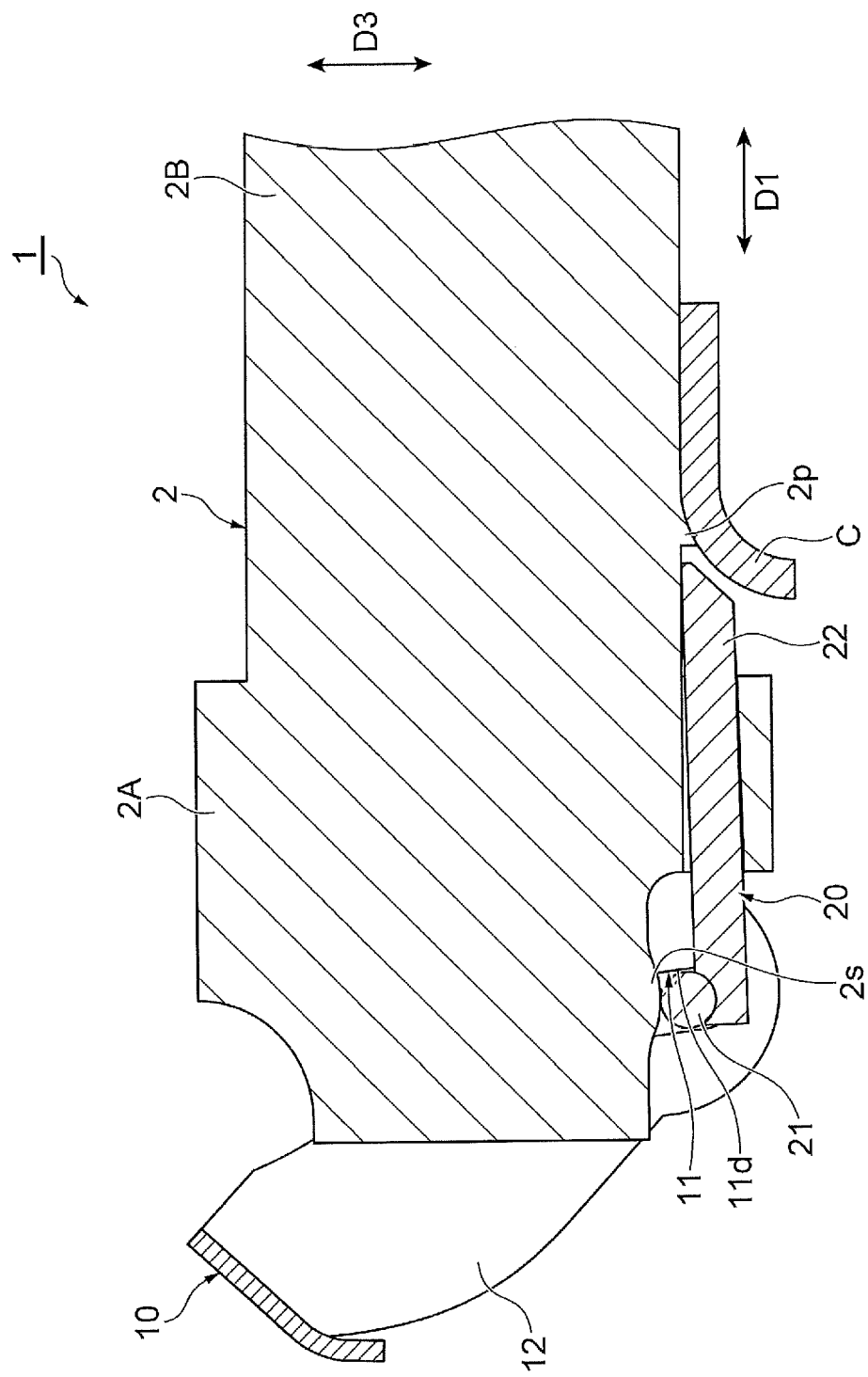
FIG. 9 is a longitudinal sectional view illustrating the sliding member in the state of FIG. 7.

Next, the disengagement of the optical transceiver 1 from the cage will be described. First, in a state where the optical transceiver 1 is engaged with the cage, the second spindle 21 is located at the second circular area 11*c* of the through-hole 11 (refer to FIGS. 4, 5, and 6). When the bail 10 rotates forward and downward in this state, as illustrated in FIGS. 7, 8, and 9, the bail 10 performs the rotating operation around the center line of the first spindle 2*h*, and the through-hole 11 rotates around the center line of the first spindle 2*h*, so that the second spindle 21 moves rearward along the first direction D1 in association with the rotation of the through-hole 11. At this time, when the through-hole 11 rotates, the second spindle 21 moves from the second circular area 11*c* to the straight area 11*d* and also moves in the straight area 11*d* toward the first circular area 11*b*.

Figure 10:
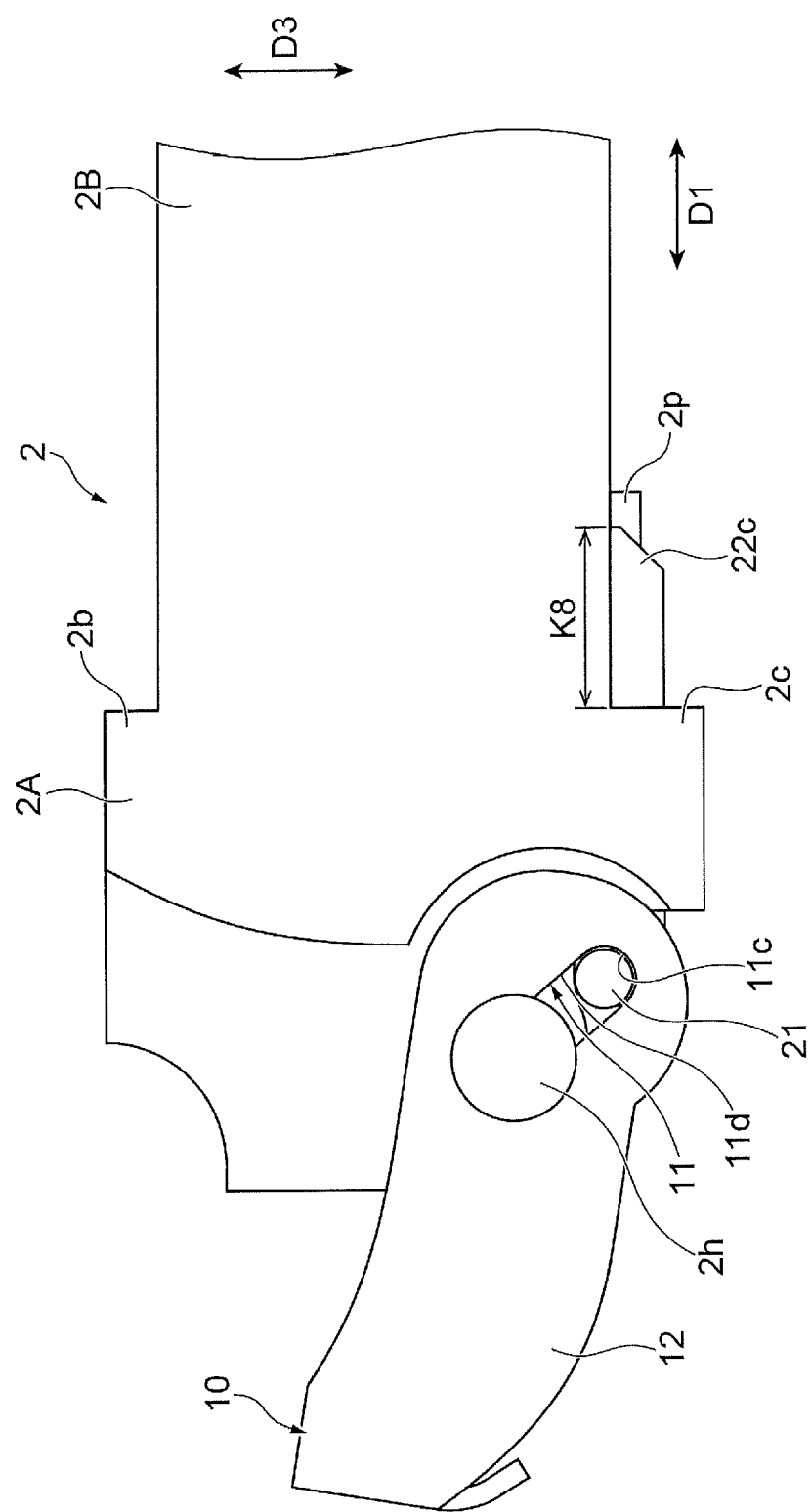
FIG. 10 is a side view illustrating a state where the rotational member of FIG. 7 is further rotated.
Figure 11:
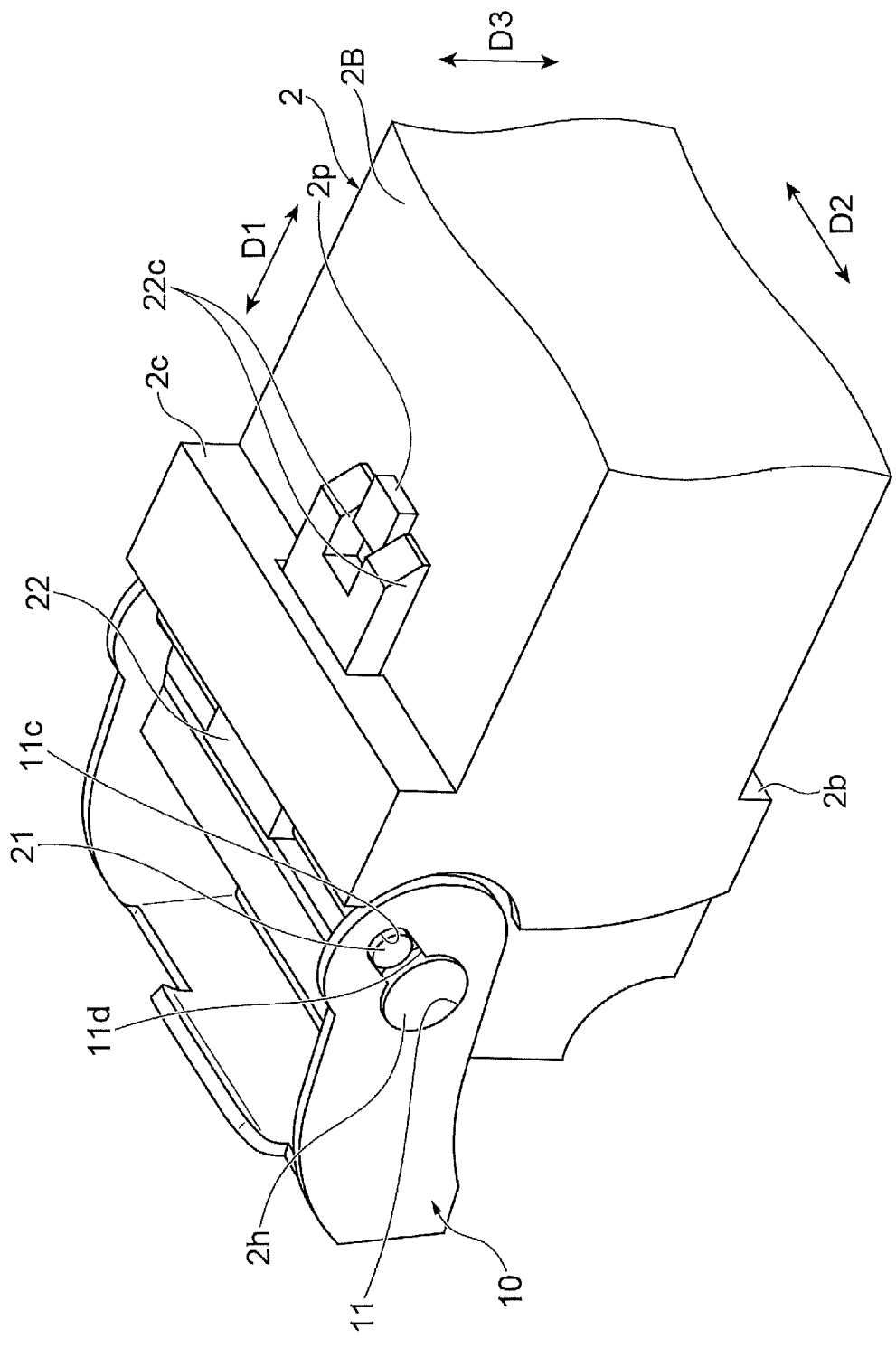
FIG. 11 is a perspective view illustrating the sliding member in the state of FIG. 10.
Figure 12:
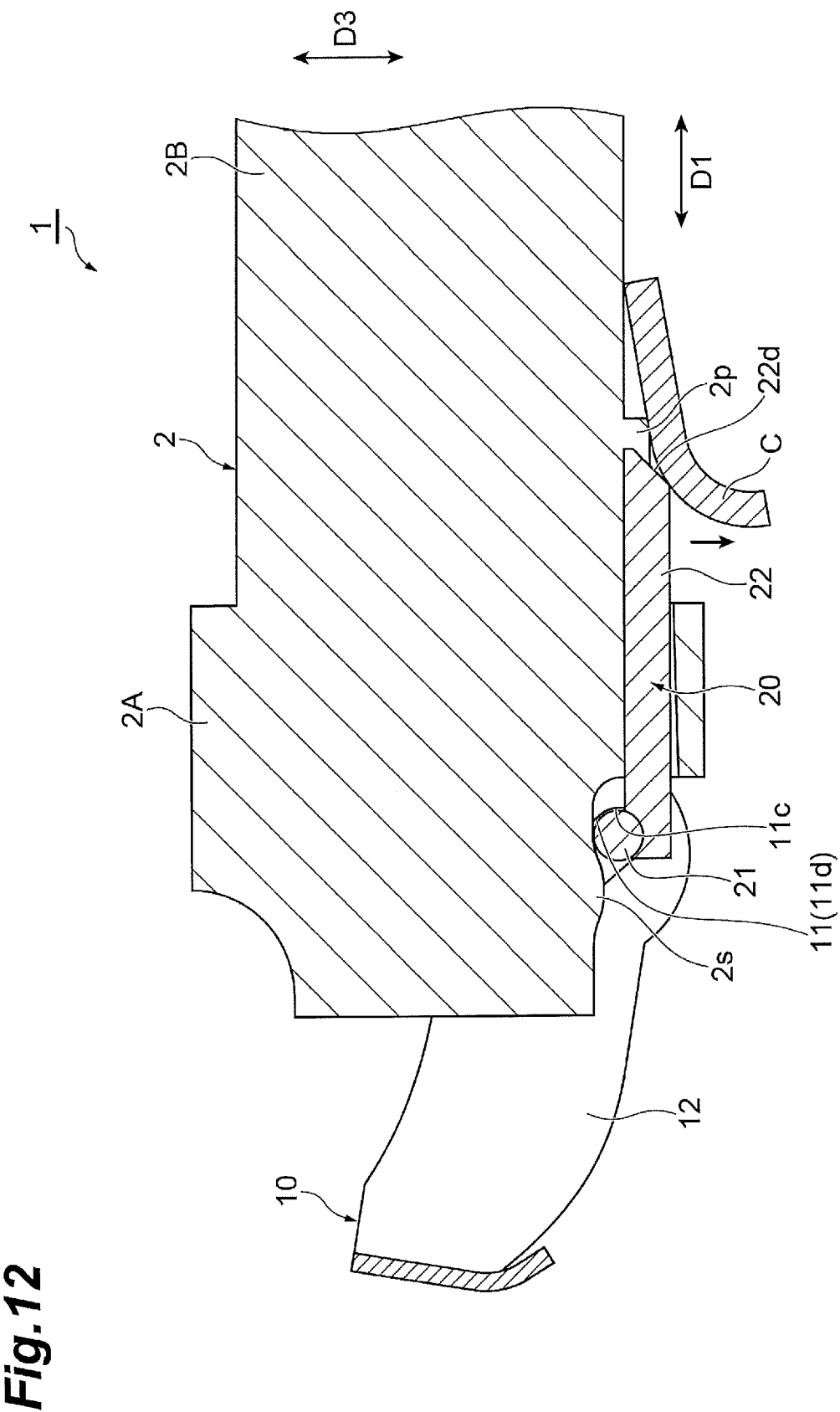
FIG. 12 is a longitudinal sectional view illustrating the sliding member in the state of FIG. 10.

When the bail 10 further rotates forward and downward, as illustrated in FIGS. 10, 11, and 12, the second spindle 21 moves further rearward along the first direction D1 and moves further rearward over the stopper 2*s*. At this time, the second spindle 21 moves away from the first spindle 2*h* and moves from the straight area 11*d* to the second circular area 11*c*. Then, the tapered portion 22*c* located at the rear end of the release portion 22 abuts against the cage tab C, and the inclined surface 22*d* pushes the cage tab C downward, so that the cage tab C is disengaged from the optical transceiver 1. Accordingly, the user can extract the optical transceiver 1 from the cage (not illustrated) by pulling the bail 10 forward. FIGS. 10, 11, and 12 illustrate the state where the bail 10 has been rotated to the maximum. When the slider 20 moves forward from the position illustrated in FIGS. 10, 11, and 12 by the push-back force of the above-mentioned cage tab C, there is a concern that the disengagement of the cage tab C becomes incomplete, so that the optical transceiver 1 may not be smoothly withdrawn from the cage, or the engagement of the cage tab C becomes incomplete, so that the optical transceiver 1 may be unintentionally pulled out of the cage. For example, when the optical transceiver 1 is plugged into the cage, an optical connector attached to a distal end of an optical fiber is inserted into the receptacle 4 for communication. When the engagement is incomplete, the optical transceiver 1 may easily come out of the cage when the optical fiber is pulled, and thus, there is a concern that communication may be interrupted.

When the tapered portion 22*c* abuts against the cage tab C, the tapered portion 22*c* receives a forward spring force from the cage tab C. However, even when the second spindle 21 receives the forward spring force, the second spindle 21 abuts against the stopper 2*s*, the second spindle 21 is stopped from moving forward by the resistive force necessary to overcome the stopper 2*s*. Accordingly, the slider 20 can be prevented from moving forward and disengaging unintentionally. It is noted that, a distance K8 from the rear end of the second step portion 2*c* to the rear end of the slider 20 (the tapered portion 22*c* of the release portion 22) at the time of performing the most rotating operation is, for example, 2.95±0.25 mm. The stopper 2*s* allows the slider 20 to stably maintain the distance K8.

Next, the functions and effects obtained from the optical transceiver 1 according to this embodiment will be described in more detail. In the optical transceiver 1, a housing 2 has an outer part 2A and an inner part 2B, and a bail 10 and a slider 20 are attached to the outer part 2A. The outer part 2A has a first spindle 2h around which the bail 10 rotates. The slider 20 has a second spindle 21 that is engaged with the bail 10. The bail 10 has a through-hole 11. The through-hole 11 includes a first circular area 11b engaged with the first spindle 2h of the outer part 2A, a second circular area 11c engaged with the second spindle 21 of the slider 20, and a straight area 11d that connects the first circular area 11b and the second circular area 11c to each other.

When the bail 10 rotates about the center line of the first spindle 2h, in association with the rotation of the through-hole 11, the second spindle 21 moves between the second circular area 11c and the straight area 11d, and the release portion 22 connected to the second spindle 21 moves toward the inner part 2B side (rear side) of the housing 2. In association with the rotating operation of the bail 10, the slider 20 moves toward the inner part 2B side, and the tapered portion 22c of the slider 20 abuts against the cage tab C to push the cage tab C down. As a result, the cage tab C can be disengaged. Therefore, even when the outer part 2A has an elongated outer shape that extends in the first direction D1, the disengagement can be appropriately performed by setting the length of the release portion 22 to an appropriate size by the rotating operation of the bail 10 and the movement of the slider 20 due to lengthening.

The second spindle 21 may move along the first direction D1 by the rotating operation of the bail 10. In this case, the second spindle 21 moves along the first direction D1 in association with the rotating operation of the bail 10, so that the slider 20 can smoothly move toward the inner part 2B side of the housing 2. Therefore, due to the cooperation between the bail 10 and the slider 20, since a rotating motion of the bail 10 during the rotating operation is converted into a linear motion of the slider 20 along the first direction D1, even though the position of the bail 10 is away from the inner part 2B, the cage tab C can be disengaged due to lengthening.

The slider 20 may have the inner end 21B rearward from the outer end 21A in the first direction D1. The inner end 21B may move the cage tab C of the host system (apparatus) according to the rotating operation of the bail 10. In this case, the disengagement can be appropriately performed with the inner end 21B located rearward from the outer end 21A of the slider 20. For example, even when the distance between the bail 10 and the inner part 2B is increased due to lengthening, by increasing the length of the slider 20 in the first direction D1 (from the front end of the outer end 21A to the rear end of the inner end 21B), the disengagement can be performed by pushing the cage tab C downward due to the rotating operation of the bail 10.

The distance K1 to the second spindle 21 from the reference line L passing through the center of the outer part 2A and extending along the first direction D1 may be longer than the distance K2 from the reference line L to the first spindle 2h. In this case, since the distance K1 from the reference line L to the second spindle 21 is longer than the distance K2 from the reference line L to the first spindle 2h, the second spindle 21 of the slider 20 can be moved more smoothly along the first direction D1 at the position away from the reference line L.

The diameter of first spindle 2h may be larger than the diameter of second spindle 21. The diameter of the circular area of the first circular area 11b may be larger than the diameter of the semi-circular area of the second circular area 11c. In this case, the rotating operation of the bail 10 about the center line of the first spindle 2h and the movement of the slider 20 in the first direction D1 can be performed more smoothly.

The outer part 2A may have a convex-shaped stopper 2s against which the second spindle 21 moved by the rotating operation of the bail 10 abuts. The distance K6 to the center of the second spindle 21 from the reference line L passing through the center of the outer part 2A and extending along the first direction D1 when the bail 10 is not rotating and when the bail 10 is most rotating may be smaller than the distance K7 from the reference line L to the end of the inner part 2B. By providing the stopper 2s against which the moved second spindle 21 abuts, by the spring force of the cage tab C, the second spindle 21 is prevented from returning forward from the position when the bail 10 is most rotating. Since the distance K6 from the reference line L to the center of the second spindle 21 is smaller than the distance K7 from the reference line L to the end of the inner part 2B, the linear motion of the slider 20 along the direction D1 in association with the rotating operation of the bail 10 can be stabilized.

Heretofore, the embodiments of the optical transceiver according to the present disclosure have been described. However, the invention is not limited to the embodiments described above. That is, it is easily recognized by those skilled in the art that the present invention is capable of various modifications and changes within the scope of the spirit described in the claims. For example, the shape, size, number, material, and layout of each portion of the optical transceiver can be changed as appropriate without departing from the spirit described above.

For example, in the above-described embodiment, an example where the diameter of the first spindle 2h of the housing 2 is larger than the diameter of the second spindle 21 of the slider 20 has been described. However, the diameter of the first spindle of the cage may be smaller than the diameter of the second spindle of the slider, and the size relationship between these diameters is not particularly limited. However, it is preferable that the first spindle 2h is always engaged with the first circular area 11b of the through-hole 11 and a mutual positional relationship is fixed. Therefore, when the diameter of the first spindle 2h is smaller than the diameter of the second spindle 21, for example, it is preferable that the straight area 11d is configured so that the first spindle 2h does not move toward the second circular area 11c. In addition, in the above-described embodiment, an example where the optical transceiver 1 is a Type 2 module of the SFP-DD standard has been described. However, the optical transceiver according to the present disclosure may be an optical transceiver conforming standards other than the SFP-DD standard.

What is claimed is:

1. An optical transceiver to be inserted into an apparatus along a first direction and be engaged with the apparatus, the optical transceiver comprising:
   an outer part provided outside the apparatus upon an engagement of the optical transceiver with the apparatus, the outer part including a first spindle, a rotational member, a sliding member, the rotational member being configured to rotate on the first spindle, the sliding member configured to move along the first direction, the rotational member having a hole, the sliding member having a second spindle, the first spindle and the second spindle being fit with the hole; and
   an inner part provided inside the apparatus upon the engagement with the apparatus,
   wherein the hole has a first circular area, a second circular area, and a straight area, the first spindle being fit with the first circular area, the second spindle being fit with the second circular area, the straight area being connected between the first circular area and the second circular area.

2. The optical transceiver according to claim 1, wherein the second spindle moves along the first direction when the rotational member rotates on the first spindle.

3. The optical transceiver according to claim 1, wherein the sliding member has an outer end and an inner end in the first direction,
wherein the outer end includes the second spindle, and
wherein the inner end moves a cage tab of the apparatus when the rotational member rotates on the first spindle.

4. The optical transceiver according to claim 1, wherein the outer part has a first distance between the second spindle and a center line, the first distance being larger than a second distance between the first spindle and the center line, the center line passing a center point of the outer part and extending along the first direction.

5. The optical transceiver according to claim 1, wherein the first spindle has a diameter larger than a diameter of the second spindle, and
wherein the first circular area has a diameter larger than a diameter of the second circular area.

6. The optical transceiver according to claim 1, wherein the outer part has a protrusion, and
wherein the second spindle climbs over the protrusion while the rotational member rotates.

7. The optical transceiver according to claim 1, wherein the outer part has a third distance between a center line and a center of the second spindle, the third distance being larger than a fourth distance between the center line and a bottom face of the inner part, the center line passing a center point of the outer part and extending along the first direction.

* * * * *